(No Model.)
E. J. HAENDLER.
CORN REMOVER.
No. 370,474.  Patented Sept. 27, 1887.
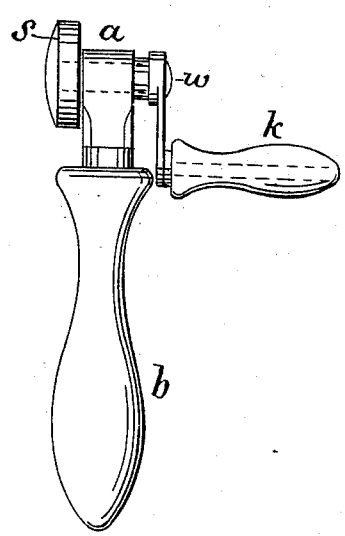
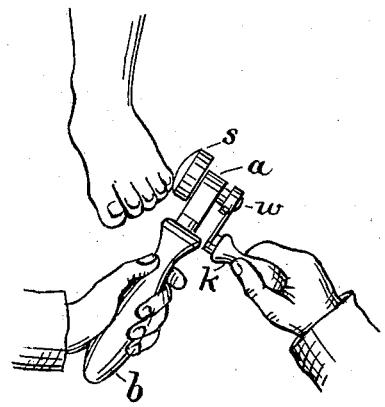
Witnesses:
Sidney L. Johnson
James B. Nicholson
Inventor:
Ernst Julius Haendler
By W. H. Babcock
Attorney

UNITED STATES PATENT OFFICE.

ERNST JULIUS HAENDLER, OF PIRNA, SAXONY, GERMANY.

CORN-REMOVER.

SPECIFICATION forming part of Letters Patent No. 370,474, dated September 27, 1887.

Application filed April 28, 1887. Serial No. 236,515. (No model.)

*To all whom it may concern:*

Be it known that I, ERNST JULIUS HAENDLER, soap-manufacturer, of Pirna, a citizen of Germany, residing at Pirna, in the Kingdom of Saxony, have invented certain new and useful Improvements in the Manufacture of an Apparatus for Safely and Painlessly Removing Corns; and I do hereby declare the following to be a full, clear, and exact description of the invention, such as will enable others skilled in the art to which it appertains to make and use the same.

The object of my invention is to effect the removal of corns and other excrescences in a painless manner and free from danger.

In carrying out my invention I mount upon a suitable handle a metallic support or bearing for a short axle, which passes through the same, and which axle is fitted at one end with a small handle for turning the same, and at the other end with a small piece of sandstone of the finest grain obtainable, or equivalent material. The form of the sandstone is that of a semi-oblate spheroid.

In order to remove a corn or similar excrescence, the instrument is held in one hand while the stone is rotated in contact with the corn, and with very slight pressure, whereby the corn is painlessly ground away.

In order that my said invention may be particularly described and ascertained, reference is hereby made to the accompanying drawings, in which similar letters of reference indicate corresponding parts.

Figure 1 is an elevation of the apparatus, and Fig. 2 shows the method of applying the same.

$a$ is a piece of metal, the shank of which is driven into the handle $C$.

$w$ is a short axle or spindle passing through $a$, the latter affording a bearing for said spindle.

$k$ is a crank-handle, fitted to the axle $w$, and $s$ is a small block of fine-grained sandstone (or equivalent material) cut to the form of a semi-oblate spheroid, or approximating to such form.

In Fig. 2 the apparatus is shown as applied by being held in contact with a corn by the left hand of the operator while the handle $k$ is turned with the right hand. The stone is usually moistened with water previously to applying the same, whereby the corn is reduced and removed.

Having now particularly described and ascertained the nature of my said invention and in what manner the same is to be performed, I declare that what I claim is—

A device for removing corns, consisting of a rotary grinding-block, a spindle on which it is mounted, and a crank-handle for operating them, in combination with a handle, $b$, and a piece of metal bearing for said shaft, attached to the latter handle, substantially as set forth.

In testimony whereof I affix my signature in presence of two witnesses.

ERNST JULIUS HAENDLER

Witnesses:
 CARL F. REICHELT,
 PAUL DRUCKMÜLLER.